United States Patent

Kellner et al.

[11] Patent Number: 5,884,606
[45] Date of Patent: Mar. 23, 1999

[54] SYSTEM FOR GENERATING HIGH FUEL PRESSURE FOR A FUEL INJECTION SYSTEM USED IN INTERNAL COMBUSTION ENGINES

[75] Inventors: Andreas Kellner, Tamm; Peter Schubert, Leingarten, both of Germany

[73] Assignee: Robert Bosch GmbH, Stuttgart, Germany

[21] Appl. No.: 894,835

[22] PCT Filed: Aug. 23, 1996

[86] PCT No.: PCT/DE96/01564

§ 371 Date: Aug. 29, 1997

§ 102(e) Date: Aug. 29, 1997

[87] PCT Pub. No.: WO97/24526

PCT Pub. Date: Jul. 10, 1997

[30] Foreign Application Priority Data

Dec. 29, 1995 [DE] Germany .................. 195 49 108.4

[51] Int. Cl.$^6$ .................................................. F02M 37/04
[52] U.S. Cl. .................... 123/446; 123/458; 251/129.07
[58] Field of Search ................................. 123/446, 506, 123/458, 457, 462; 251/129.07; 137/870

[56] References Cited

U.S. PATENT DOCUMENTS

| | | | |
|---|---|---|---|
| 4,621,604 | 11/1986 | Abthoff | 123/446 |
| 4,840,163 | 6/1989 | Alsobrooks | 137/870 |
| 4,884,545 | 12/1989 | Mathis | 123/446 |
| 4,915,134 | 4/1990 | Toliusis | 251/129.07 |
| 5,082,180 | 1/1992 | Kubo | 251/129.07 |
| 5,605,386 | 2/1997 | Ziegler | 251/129.07 |
| 5,607,137 | 3/1997 | Kanda | 251/129.07 |

*Primary Examiner*—Carl S. Miller
*Attorney, Agent, or Firm*—Edwin E. Greigg; Ronald E. Greigg

[57] ABSTRACT

The invention relates to a system for generating high fuel pressure for a fuel injection system used in internal combustion engines in which via a low-pressure pump fuel aspirated from a fuel tank is delivered via a low pressure line and at least one valve to a high-pressure pump, and some of the fuel stream is diverted to the return loop from the low pressure line at or upstream of the high-pressure pump. In the low pressure line, an electrically controlled flow regulating valve is inserted between the low-pressure pump and the high-pressure pump. The flow regulating valve splits the fuel stream supplied. One portion is delivered to the high-pressure pump, and the remainder is relieved into the return loop. The flow regulating valve requires little space and only a few connections and is simple to manipulate.

1 Claim, 2 Drawing Sheets

SYSTEM FOR GENERATING HIGH FUEL PRESSURE FOR A FUEL INJECTION SYSTEM USED IN INTERNAL COMBUSTION ENGINES

PRIOR ART

The invention is based on a system for generating high fuel pressure for a fuel injection system used in internal combustion engines.

One such system is known from European Patent Disclosure EP 0 270 720 A1. There, on the one hand a high-pressure pump downstream of a low-pressure pump is described, and on the other a controller comprising a plurality of hydraulic valves is described. The valves are used to split the volumetric flow furnished by the low-pressure pump into a work flow to be delivered to the high-pressure pump and a residual flow to be relieved into a fuel tank. The valves include at least one pressure limiting valve integrated into a return line and optionally remote-controlled. Also built into the low pressure line alternatively are a throttle valve, a throttle valve adjustable under remote control, a 2/2-way valve and a 3/3-way valve. These last two valves are also remote-controlled.

In the prior art, to control a feed quantity of the low-pressure pump that is virtually dependent on fuel demand, hydraulic component groups are needed that always include a plurality of components.

ADVANTAGES OF THE INVENTION

In the subject of the invention, an electrically controlled flow regulating valve is used in the low pressure line between the low-pressure pump and the high-pressure pump. The valve splits the supplied fuel stream. One part is delivered to the high-pressure pump, and the remainder is relieved into the return loop. The remaining fuel can be used in Diesel engines and others for lubricating the high-pressure pump.

The flow regulating valve, which for instance is an electromagnetically actuated longitudinal slide valve, is incorporated directly into the low pressure line. It requires little space, only two connections that are under fuel pressure, and an electric trigger line. In this way, it is easy to install and to replace.

BRIEF DESCRIPTIONS OF THE DRAWINGS

Further details of the invention will become apparent from the ensuing description of a schematically shown embodiment:

FIG. 1: a hydraulic circuit diagram for a system for generating high fuel pressure with a symbolically shown low-pressure pump and a symbolically shown high-pressure pump, and FIG. 2: the flow regulating valve in longitudinal section.

DESCRIPTION OF THE EXEMPLARY EMBODIMENT

Figure 1:
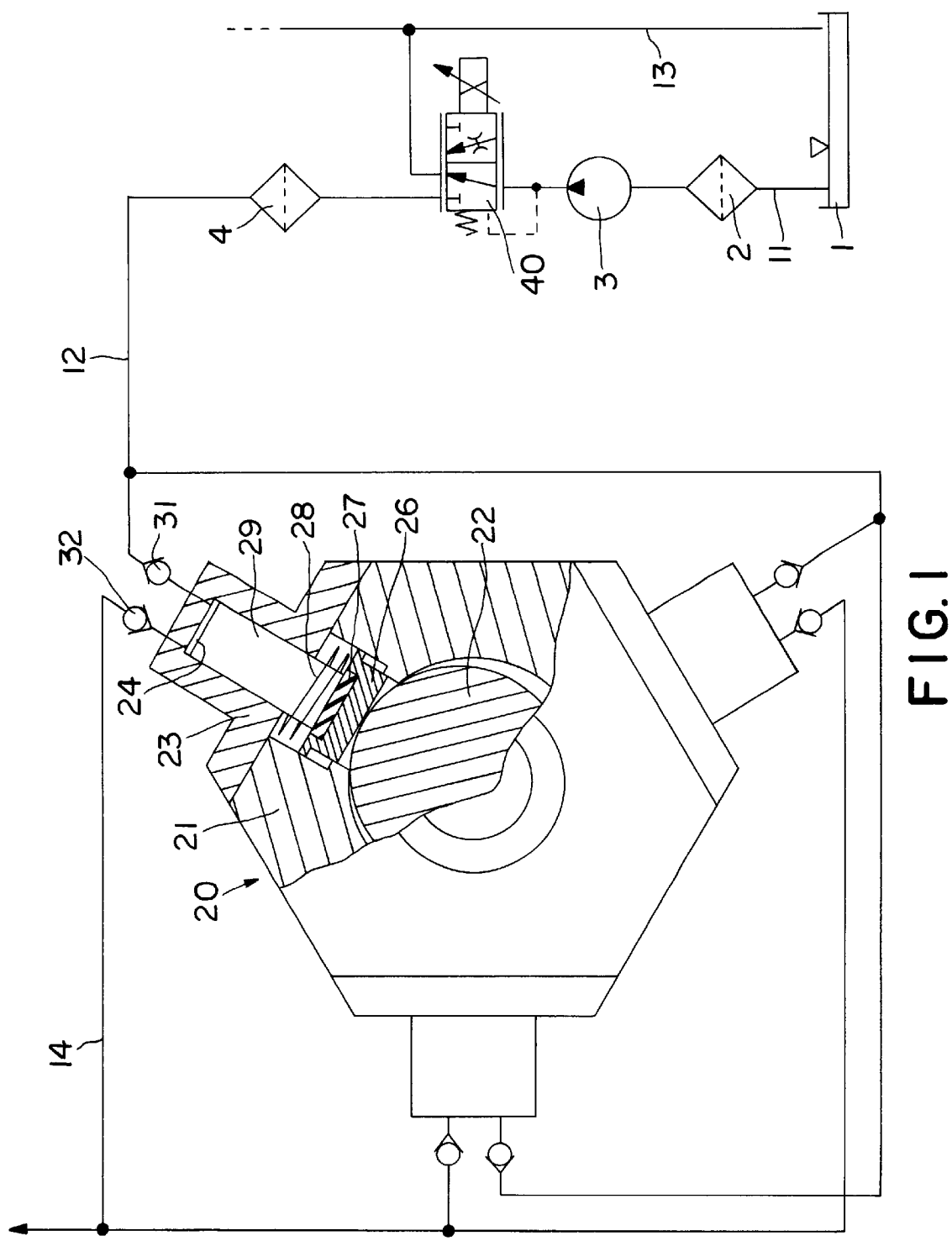

FIG. 1 shows some essential portions of a system for generating high fuel pressure in internal combustion engines. The fuel, which is under high pressure, is delivered to a downstream fuel injection system.

For generating high fuel pressure, the fuel is aspirated from a fuel tank (1) by means of a low-pressure pump (3), which for instance is electrically driven, and is pumped via a flow regulating valve (40) to a high-pressure pump (20) and/or into a return line (13). A filter (2) is built into a suction line (11) disposed between the fuel tank (1) and the low-pressure pump (3). A fine filter (4) is integrated into a low pressure line (12) located between the flow regulating valve (40) and the high-pressure pump (20).

The low pressure line (12) leads to the inlet check valve (31) of the high-pressure pump (20). By way of the previous mentioned valves, which are disposed on or in the high-pressure pump (20), the fuel reaches the cylinder chambers (24). In the three-cylinder high-pressure pump (20) shown, one high-pressure piston (29) moves in each cylinder chamber (24). The piston is guided in a cylinder (23). The high-pressure piston (29) is moved in at least a compression stroke via an eccentric (22) or cam, supported in an eccentric housing (21), with the interposition of an intermediate piston (26). In this process, the intermediate piston (26) pushes the high-pressure piston (29) in front of it. The quantity of fuel present in the cylinder chamber (24) is thus forced into a high pressure line (14) via an outlet check valve (32). Via the high-pressure line (14), the fuel is pumped into a high-pressure fuel reservoir, not shown.

In the intake phase, or as the eccentric stroke is decreasing, the intermediate piston (26) is moved by means of a compression spring (28) toward the center line of the eccentric housing. The high-pressure piston (29) is forced backward by the fuel flowing in via the inlet check valve (31). The return stroke is dependent on the quantity of fuel furnished via the inlet check valve (31). If the engine at low partial load or in idling, for instance, for instance requires only little fuel then the return stroke of the high-pressure piston (29) is short. The intermediate piston (26) in the next working stroke comes into contact with the high-pressure piston (29) only just before top dead center. To damp the force of the collision between the two pistons (26) and (29), a damping element (27) is embedded in the top side of the intermediate piston (26). By way of example, the damping element (27) is made of a rubber-elastic material. Hydraulic damping is also conceivable.

The fuel stream that is furnished to the high-pressure pump (20) by the low-pressure pump (3) is controlled by a flow regulating valve (40). The design of the flow regulating valve is shown in simplified form in FIG. 2.

The flow regulating valve (40) here has an approximately parallelepiped housing (41) with a central slide bore (42). This bore is embodied as a blind bore, in which a longitudinal slide (60) is inserted, sliding tightly. Around the rear region of the blind bore, the housing (41) is embodied approximately cylindrically. The cylindrical outer face extends coaxially with the slide bore (42). Seated on the outer face is an electromagnetic drive (74). By way of example, this drive is a proportional magnet.

Figure 2:
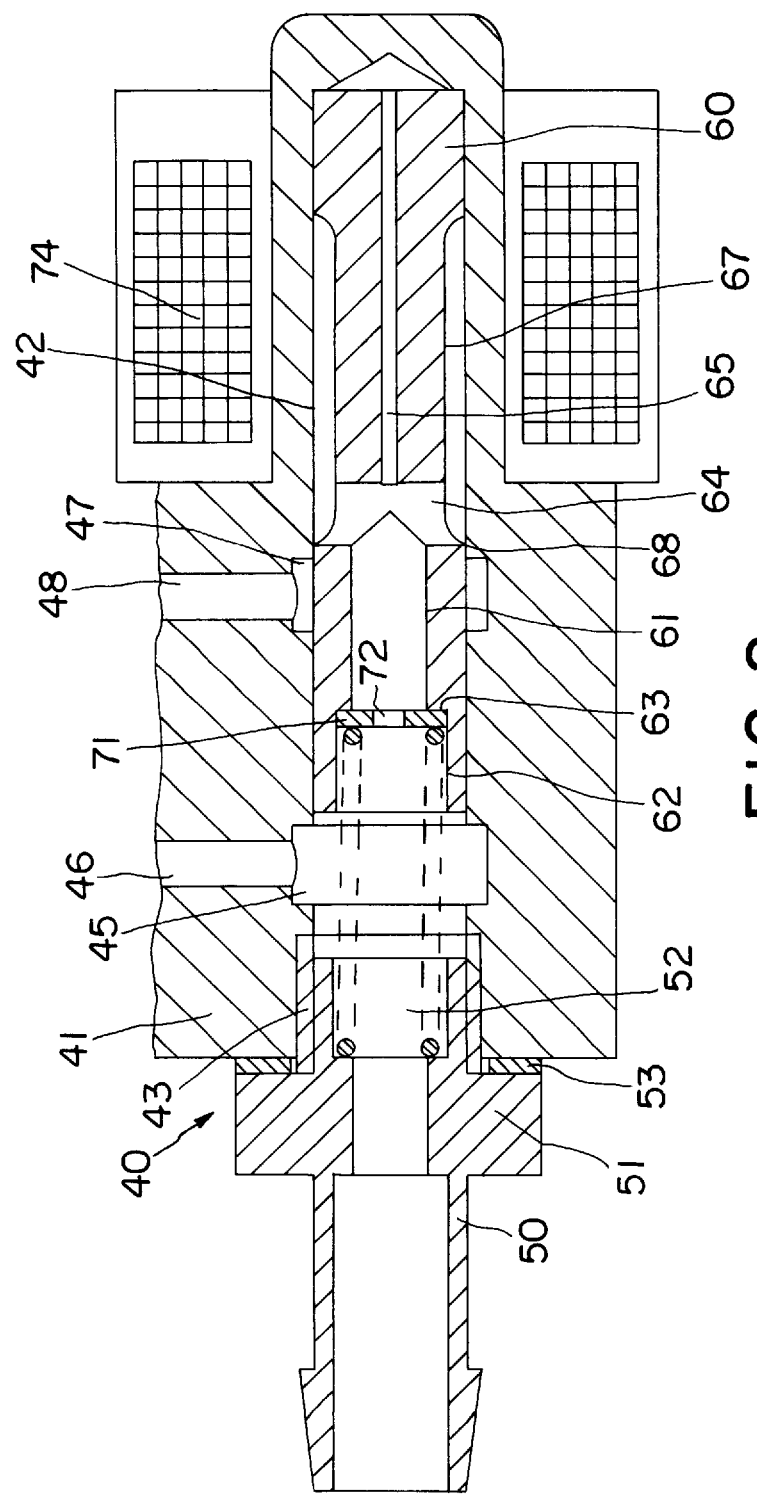

The slide bore (42), on its open end or in other words on the left in FIG. 2, has a thread (43) by way of which a connection neck (50) is secured to the housing (41). Located on the right next to the outlet of the thread (43) is an annular groove (45), into which a return bore (46) discharges radially. Disposed in the middle region of the slide bore (42) is a second annular groove (47), into which a radially oriented bore (48) likewise discharges.

The longitudinal slide (60) has primarily a cylindrical contour. In its middle region, it has a transverse bore (64), which intersects the center line of the longitudinal slide and whose cross section is on the order of magnitude of the individual cross sections of the bores (46) and (48). Extending toward this transverse bore (64) from the left face end is stepped bore (61), both of whose portions are oriented concentrically to the outer contour of the longitudinal slide (60). The first portion (62), which begins at the left face end, has a larger diameter than the second portion. At the transition between these portions there is a plane shoulder (63), on which a nozzle disk (71) rests. The nozzle disk (71) has a central throttle bore (72). It is retained on the shoulder (63) with the aid of a helical spring (75), which is braced on the connection neck (50) in a recess (52) that is geometrically comparable to the portion (62).

Located between the transverse bore 64 and the right-hand plane face end of the longitudinal slide (60) is a central relief bore (65) of small diameter.

The cylindrical outer contour of the longitudinal slide (60) has a waist (67) or flat annular groove in a region to the right next to the transverse bore (64). The transverse bore (64) discharges into the waist (67). The left-hand edge of the waist (67) forms a control edge (68), whose spacing from the annular groove (47) is approximately equivalent to the spacing between the left end face of the longitudinal slide (60) and the annular groove (45). The length of the waist (67) is at least equal to the maximum stroke of the longitudinal slide (60).

In the basic position of the flow regulating valve (40), the longitudinal slide (60) rests on the bottom of the slide bore (42). When the drive (74) is without electric current, as shown here, the force of the helical spring (75) keeps the longitudinal slide (60) in this position. The spring force may be varied by placing one or more spacer disks underneath between the collar (51) of the connection neck (50) and the left end face of the housing, next to a sealing ring (53). Via the connection neck (50), which is supplied by the low-pressure pump (3), fuel flows into the interior of the housing (41). This fuel fills the entire slide bore (42) next to the longitudinal slide (60). It flows nearly unthrottled via the return bore (46) into the return line (13); see FIG. 1. Since the control edge (68) that defines the waist (67) on the left is positioned on the right outside the annular groove (47), the feed bore (48) and the low pressure line (12) connected to it—see FIG. 1—are not supplied with fuel.

With the delivery of electric current to the electromagnetic drive (74), the longitudinal slide (60) moves to the left. As soon as the control edge (68) passes under the annular groove (47), fuel is supplied to the high-pressure pump (20) via the feed bore (48) and the low pressure line (12) adjacent to it. At the same time, a new force equilibrium is established at the longitudinal slide (60). When the annular groove (47) is opened, the fuel pressure in the longitudinal slide (60) on the right next to the throttle disk (71) drops. The annular groove (45) located farthest to the left is also closed by the extent to which the annular groove (47) opens. The total force, made up of the force of the helical spring (75) and the force from the pressure difference on either side of the throttle disk (71), now acts upon the left face end of the longitudinal slide (60). The force of the electromagnetic drive (74) acts in the opposite direction. Since the spring force and the hydraulic force are regionally nearly constant, the fuel stream flowing into the low pressure line (12) can be varied by varying the magnetic force or the electric current. By suitably controlling the electromagnetic drive (74), it is possible to supply the high-pressure pump (20) with a constant fuel stream, as long as this stream is below the volumetric flow pumped by the low-pressure pump (3). The remaining flow then enters the return loop via the return bore (46).

If maximum current is supplied to the electromagnetic drive (74), the longitudinal slide (60) moves so far to the left that its outer contour completely covers the annular groove (45). The entire fuel stream is transported into the low pressure line (12), via the stepped bore (61), the transverse bore (64), the waist (67), the annular groove (47), and the feed bore (48).

The foregoing relates to preferred exemplary embodiments of the invention, it being understood that other variants and embodiments thereof are possible within the spirit and scope of the invention, the latter being defined by the appended claims.

What is claimed is:

1. A system for generating high fuel pressure for a fuel injection system used in internal combustion engines, which comprises, a high pressure pump, a low-pressure pump (3) which aspirates fuel from a fuel tank (1) and delivers the fuel via a low pressure line (12) and at least one valve to said high-pressure pump (20), some of the fuel stream being diverted to a return loop from the low pressure line (12) upstream of the high-pressure pump (20), a flow regulating valve (40) is disposed in the low pressure line (12), which under an electrical open loop control delivers the fuel stream, furnished by the low-pressure pump (3) to the high-pressure pump (20) and under an electrical closed loop control, said flow regulating valve delivers the fuel stream furnished by the low pressure pump (3) to the return loop, said flow regulating valve (40) is an electromagnetically actuated longitudinal slide valve, having an electromagnetic drive (74) which operates counter to at least a restoring spring (75), said flow regulating valve includes a longitudinal slide (60), said longitudinal slide (60) is acted upon by low pressure on a face end facing the electromagnetic drive (74) and, in a region of said face end has a throttle valve (72) by way of which when the flow regulating valve (40) is actuated, fuel flows into a portion of the low pressure line (12) that leads onward to the high-pressure pump (20).

* * * * *